United States Patent [19]
Munroe

[11] Patent Number: 5,222,525
[45] Date of Patent: Jun. 29, 1993

[54] PLASTIC DIFFUSER

[75] Inventor: Richard W. Munroe, Millbury, Mass.

[73] Assignee: Coppus Engineering Corp., Worcester, Mass.

[21] Appl. No.: 914,438

[22] Filed: Jul. 15, 1992

[51] Int. Cl.$^5$ ............................................ F16K 19/00
[52] U.S. Cl. ..................................... 137/888; 417/195
[58] Field of Search ................. 417/195; 137/888, 890, 137/891

[56] References Cited

U.S. PATENT DOCUMENTS 3,369,735  2/1968  Hoffmeister ................... 417/195 X
4,765,373  8/1988  Munroe .

Primary Examiner—Robert G. Nilson
Attorney, Agent, or Firm—Samuels, Gauthier & Stevens

[57] ABSTRACT

A non-metallic diffuser for use in a gas flow amplifier. The non-metallic diffuser is molded from a conductive moldable resin into a truncated cone. Embedded within the outer circumferential periphery of the diffuser, located near the inlet port, are nuts for connecting the non-metallic diffuser to the housing. To allow for precise alignment of the diffuser to the housing, an extended key is projected outward from the inside edge of the inlet port of the diffuser. A handle is molded with the diffuser for ease of handling and transporting.

9 Claims, 2 Drawing Sheets

PLASTIC DIFFUSER

BACKGROUND OF THE INVENTION

1. Field of the Invention

This invention relates generally to non-metallic diffusers for use in gas flow amplifiers, and in particular to diffusers manufactured from an electrically conductive moldable resin.

2. Description of the Prior Art

An example of a conventional gas flow amplifier is disclosed in U.S. Pat. No. 4,765,373 issued to Munroe. The gas flow amplifier described therein has a housing consisting of inlet and outlet ports, nozzle openings, inlet fittings, inner and outer wall portions defining a manifold chamber and an axially extending cylindrical wall. A hollow truncated conical diffuser is attached to the housing in communication with the outlet port.

A relatively high pressure and low volume primary gas such as compressed air or steam is fed via the inlet fittings into the chamber. The gas then exits the chamber and is injected in a converging pattern into the housing towards the small diameter end of the diffuser. The primary gas draws in a flow of ambient secondary gas into the housing via the inlet port.

Gas flow amplifiers have conventionally been fabricated from sheet metal. Such materials are electrically conductive, which is often a requirement in chemically hostile and/or explosive environments which require electrostatic discharge capabilities. The metallic sheet materials are relatively heavy, in addition to being susceptible to permanent deformation when dropped or otherwise carelessly employed by workmen.

SUMMARY OF THE INVENTION

An objective of the present invention is to provide an effective gas flow amplifier having a diffuser which is made from conductive and light-weight material, and which is resistant to wear and abuse.

A companion objective of the present invention is to provide easy and accurate means for aligning the diffuser with the amplifier housing.

Another objective of the present invention is the provision of means for connecting and securing the diffuser to the housing.

Still another objective of the present invention is the provision of means to increase the ease in which the assembled amplifier and diffuser are transported.

Accordingly, the present invention is a non-metallic diffuser for use in a gas flow amplifier, having an axially extending metallic housing. The non-metallic diffuser is molded from a conductive moldable resin into a truncated cone diverging outwardly from a smaller end (attached to the metallic housing) to a larger end. Embedded within the outer circumferential periphery of the non-metallic diffuser adjacent to its smaller end are means for connecting the diffuser to an outlet port of the housing. The conductive moldable resin serves to resiliently resist permanent deformation and to dissipate static electrical charge. Means for aligning the diffuser and the housing are provided, including at least one protruding key along the outer circumferential periphery of the diffuser proximate to the inlet port of the diffuser. For ease of transporting the device, a handle may be integrally molded externally on the diffuser.

DETAILED DESCRIPTION OF PREFERRED EMBODIMENT

Figure 1:
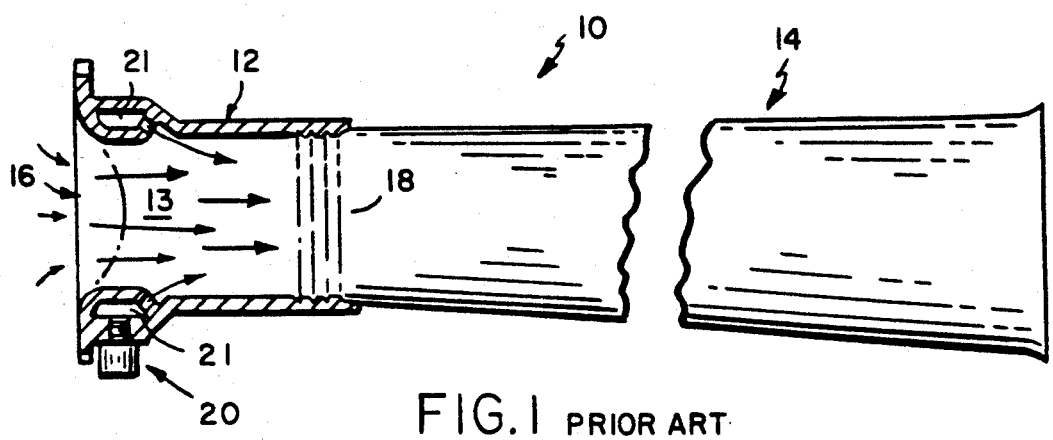
FIG. 1 shows a prior art gas flow amplifier which includes a housing and a diffuser, the housing being in section and the diffuser being partially broken away and foreshortened.

A conventional gas flow amplifier 10 including a metallic housing 12 and a diffuser 14 is illustrated in FIG. 1. The housing has an interior chamber 13 with inlet and outlet ports 16, 18 disposed at respective opposite ends thereof. A primary gas enters the housing 12 through an inlet fitting at 20, is passed through a manifold chamber 21 and then enters the interior chamber 13 of the housing. The pressurized primary gas entrains a flow of ambient secondary gas into the chamber 13 via the inlet port 16. The primary pressurized inlet gas and the entrained secondary gas exit the chamber at outlet port 18 and enter into the diffuser 14 in a combined flow pattern.

Figure 2:
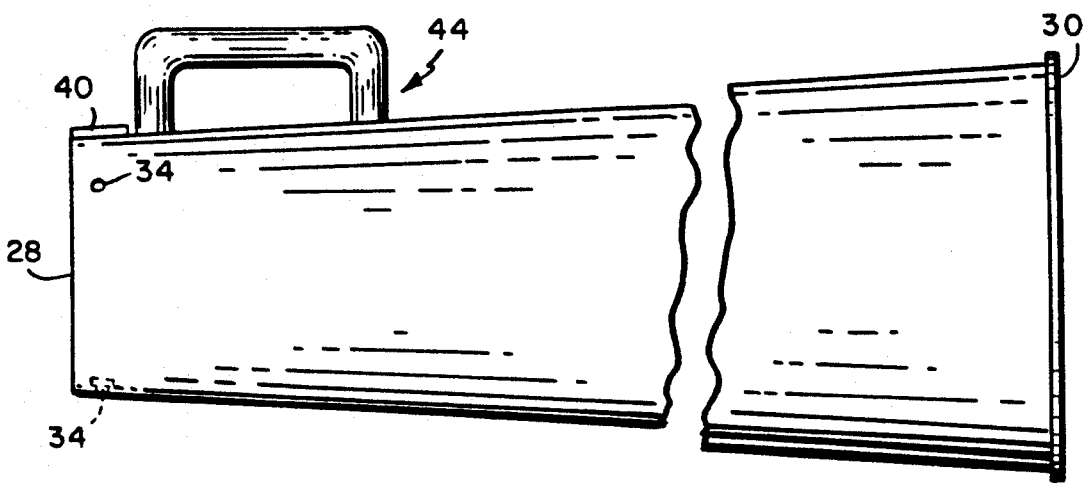
FIG. 2 shows a foreshortened side view of the diffuser in accordance with the present invention.
Figure 3:
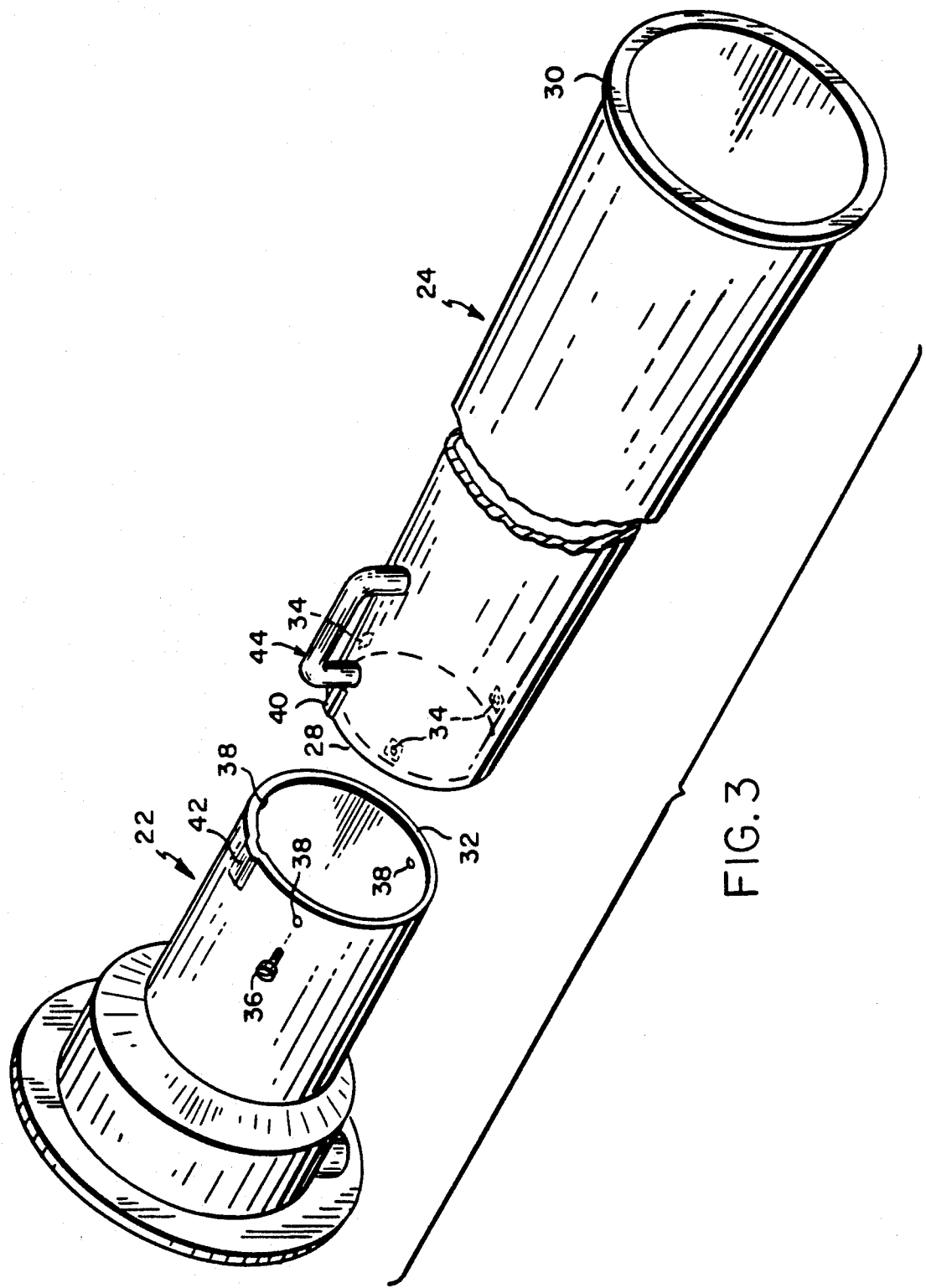
FIG. 3 shows an exploded perspective view of the diffuser and the amplifier housing prior to assembly.

A full longitudinal view of a non-metallic diffuser 24 according to the invention is shown in FIG. 2. The diffuser 24 is in the shape of a hollow truncated cone which diverges from an inlet port 28 to an outlet port 30. The inlet port 28 of the diffuser 24 is attached to the outlet port 32 of the housing 22 as is best shown in FIG. 3. Depending on the specific size of the housing 22 which is to be used in the gas flow amplifier, the exact dimensions of the inlet port 28 will vary accordingly.

The non-metallic diffuser 24 according to the present invention is electrically conductive. It is also preferred that the diffuser be lightweight and resistant to abuse. Therefore, the diffuser of the present invention is manufactured from conductive and flame retardant moldable resins. The conductive moldable resin may be comprised of a low or a medium density polyethylene. Molding has advantages in that once the original tooling of the molds is complete, the manufacturing of the diffusers is relatively uncomplicated.

Figure 4:
FIG. 4 shows an enlarged partial sectional view of a nut embedded in the periphery of the diffuser.

Referring now to FIGS. 2 through 4, hexagonal nuts 34 are shown embedded within the outer circumferential periphery of the diffuser 24 near the inlet port 28 in order to hold the diffuser 24 in a secured position with the housing 22. The inlet port 28 of the diffuser 24 slides into the outlet port of the housing. Once the inlet port 28 of the diffuser 24 is fully inserted into the outlet port 32 of the housing 22, bolts 36 are passed through holes 38 in the housing 22 and are threaded into the nuts 34 of the diffuser.

Figure 6:
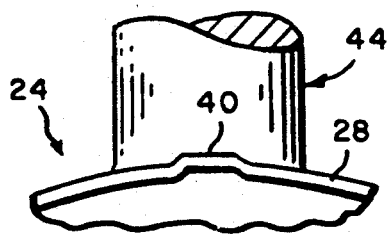
FIG. 6 shows an enlarged detail view of an exterior alignment key provided on the periphery of the diffuser.
Figure 5:
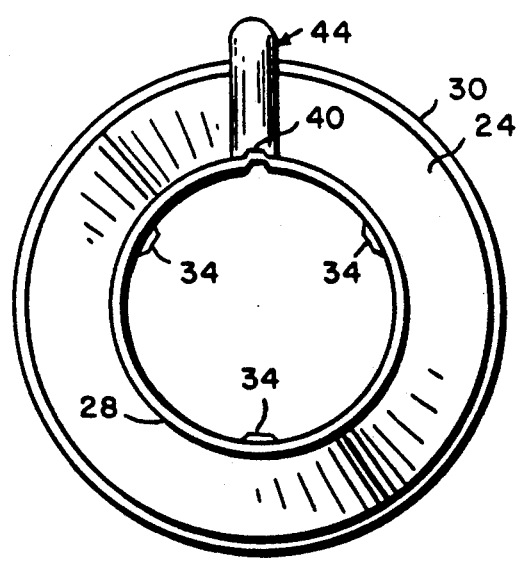
FIG. 5 shows an end view of the diffuser looking from left to right in FIG. 2.

To enhance the ease and preciseness of assembling the diffuser 24 to the housing 22, a longitudinal key 40, as seen in FIGS. 3, 5 and 6, is projected outward from the inside edge of the inlet port of the diffuser 24. With reference to FIG. 6, an enlarged view of the key 40 is illustrated. The outlet port 32 of the housing 22 will have a matched keyway 42 adapted to receive the key 40 of the diffuser.

For ease of handling and transporting the diffuser, a handle 44 is be molded externally on the diffuser 24 as shown in FIGS. 2, 3, and 5.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

What is now claimed is:

1. A diffuser for attachment to the outlet port of a gas flow amplifier, said diffuser comprising:
   a hollow, non-metallic, resilient truncated cone diverging outwardly from a smaller end to a larger end, said cone being molded from an electrically conductive moldable resin; and
   means for connecting the smaller end of said cone to said outlet port.

2. The diffuser of claim 1, wherein said conductive moldable resin comprises a low density polyethylene.

3. The diffuser of claim 1, wherein said conductive moldable resin comprises a medium density polyethylene.

4. The diffuser of claim 1, wherein said means for connecting comprises a plurality of spaced apart nuts molded into said cone at circumferentially spaced locations proximate to said smaller end.

5. The diffuser of claim 1 further comprising means for aligning said smaller end of said cone within said outlet port of said chamber.

6. The diffuser of claim 5, wherein said means for aligning comprises an externally protruding key disposed on the outer circumferential periphery of said cone proximate to said smaller end.

7. The diffuser of claim 6, wherein said key is a molded extremity of said cone.

8. The diffuser of claim 7, further comprising a handle disposed on the outer periphery of said cone proximate to said smaller end.

9. The diffuser of claim 8, wherein said handle is a molded extremity of said cone.

* * * * *